United States Patent Office 3,335,547
Patented Aug. 15, 1967

3,335,547
PROCESS FOR THE PURIFICATION OF ETHYLENE OXIDE
David Garrett, Merrick, N.Y., assignor to Halcon International Inc., a corporation of Delaware
No Drawing. Filed Jan. 25, 1965, Ser. No. 428,614
3 Claims. (Cl. 55—75)

This application is a continuation-in-part of copending application Ser. No. 296,081, filed July 18, 1963, now abandoned.

This application relates to a process for the purification of ethylene oxide and more particularly to the removal of acetaldehyde from an ethylene oxide stream.

It is known in the art that ethylene oxide may be prepared by the direct oxidation of ethylene in air by contacting ethylene with molecular oxygen or by hypochlorination of ethylene to the chlorohydrin followed by dehydrochlorination. These methods, particularly the chlorohydrin method, are accompanied by the formation of acetaldehyde which is difficult to separate because the relative volatility of ethylene oxide to acetaldehyde is low, particularly at higher operating pressures. In such processes acetaldehyde is frequently present in sufficient amounts to yield unsatisfactory ethylene oxide product. In order to produce ethylene oxide of desired purity, it is necessary to utilize expensive separation means such as large scale distillation apparatus.

It is a feature of the present invention to produce ethylene oxide product of high purity.

It is another feature of the invention to supply a method of purifying ethylene oxide which results in minimum distillation costs.

It is still another feature of the invention to produce high purity ethylene oxide by passing an ethylene oxide stream containing acetaldehyde through a bed selective adsorbents having pore diameters of at least 5 angstrom units so as to preferentially adsorb acetaldehyde therein and obtain an effluent substantially free of acetaldehyde which will meet commercial ethylene oxide product specification requirements.

Adsorbents particularly useful for such purposes are termed in the chemical process industries as molecular sieves.

These molecular sieves are crystalline synthetic materials having a composition expressed in terms of the oxides as follows:

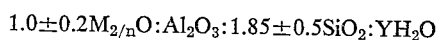

$$1.0 \pm 0.2 M_{2/n}O : Al_2O_3 : 1.85 \pm 0.5 SiO_2 : YH_2O$$

wherein M represents at least one of the materials in the group consisting of hydrogen, ammonium, metals in Groups I and II of the periodic table, and the transition metals of the periodic table, $n$ represents the valence of M and Y may be any value up to about 6.

A further discussion of these materials may be found in U.S. Patent 2,882,243.

For example, in the direct air oxidation of ethylene to form ethylene oxide it has been found that there is frequently contained in said ethylene oxide, depending on the exact oxidation conditions, about 100 to 3000 parts per million of acetaldehyde or more. Utilization of the present invention results in an ethylene oxide product substantially free of acetaldehyde.

It is a feature of the present invention, by the utilization of molecular sieves having pore diameters of about 5 angstrom units, to reduce the acetadehyde concentration in the ethylene oxide product to less than about 40 parts per million.

By utilizing a plurality of beds in parallel the process may be operated continuously. The ethylene oxide stream containing acetaldehyde is passed through a fixed or moving bed of molecular sieves and acetaldehyde is preferentially adsorbed in the bed until the acetaldehyde concentration in the ethylene oxide outlet stream approaches the acetaldehyde concentration in the feed ethylene oxide stream. When this condition is reached, the bed ceases to adsorb acetaldehyde and must be regenerated. By utilizing at least two molecular sieve beds in the process, when one bed is saturated with acetaldehyde, the feed stream may be switched into the second bed for adsorption of acetaldehyde and the first bed is regenerated.

Regeneration may be effected by pulling a vacuum on the system until the acetaldehyde is removed, by displacement with a material mass easily adsorbed on the sieves, such as steam, hydrogen, nitrogen, or other inert gas, by the application of heat or by the combination of any of the above methods. At higher temperatures more favorable regeneration occurs.

After regeneration, the desorbed material can be recycled to a refinery tower so that there is no net loss of acetaldehyde except for materials swept out by the regenerating agent.

The invention is illustrated by the following examples. As used in the specification, the term "superficial space velocity" means volume of flow per unit time per unit cross-sectional area.

Example 1

An overhead liquid stream from an ethylene oxide refining tower containing over 95% ethylene oxide and approximately 100 p.p.m. of acetaldehyde is passed through a 10 foot bed of Linde Molecular Sieve sodium zeolite A at a superficial space velocity of about 2 ft./second. The stream is at 45° C. and 75 p.s.i.a. The initial effluent from the bed is found to contain less than 10 p.p.m. of acetaldehyde. The feed through the bed is continued until the average acetaldehyde concentration of the total effluent is 40 p.p.m. At this point the flow of the ethylene oxide stream is topped and the bed is regenerated by passing a stream of nitrogen heated to a temperature of 350° F. through the bed until the outlet nitrogen stream from the bed is free of acetaldehyde. The ethylene oxide feed stream is then passed through the bed and there is obtained an initial effluent containing about 10 p.p.m. of ethylene oxide. The feed is passed through the bed until the average actaldehyde concentration of the total effluent is again 40 p.p.m. after which the bed is again regenerated as above.

Example 2

An overhead vapor stream from an ethylene oxide refining tower containing over 80% ethylene oxide and 400 p.p.m. of acetaldehyde is passed through a 15 foot bed of Linde Molecular Sieve calcium zeolite A at a superficial space velocity of about 3 ft./second. The stream is at 55° C. and 40 p.s.i.a. The initial effluent from the bed is found to contain less than 10 p.p.m. of acetaldehyde concentration of the total effluent is 40 p.p.m. The flow is stopped and the bed is regenerated as described in Example 1, after which flow is continued through the bed to remove acetaldehyde, as described above.

The foregoing examples demonstrate that utilization of a bed of molecular sieves for the separation of acetaldehydes from ethylene oxide results in a substantially pure ethylene oxide product suitable to meet product specification requirements.

It will be readily apparent to one skilled in the art that the process of the present invention may be utilized with any method of producing ethylene oxide in which acetaldehyde is present in the system either as an impurity, an oxidation product or as an isomerization product.

As illustrated by the examples, the process can take place in either the liquid or vapor phase. The purification system can be utilized with ethylene oxide bottoms coming from a reaction stream or distillation column, or from a stream of ethylene oxide reaction vapors or distillation overheads.

The temperature at which the process takes place is not critical to the selectivity of the acetaldehyde adsorption; effective separation of the components will take place over the entire range of temperatures encountered in normal ethylene oxide purification processes. It is well known in the ethylene oxide art that when concentrated ethylene oxide process streams are heated above about 100° C., some polymerization of oxide may occur, same co-polymerization of oxide and trace quantities of aldehydic material may occur, and color bodies may form. Thus it is preferred to operate the adsorption process herein disclosed, as in distillations or other processes involving concentrated ethylene oxide streams, at temperatures not exceeding 100° C.

Although most ethylene oxide purification processes are carried out at temperatures in the range of 30° to 70° C. it may in certain cases, be desirable to employ refrigeration and carry out the processes at temperatures as low as 0° C. The adsorption process is useful in those circumstances also and may be employed at the 0° C. level as well as in the more preferred ambient range.

The pressure of the liquid or gas stream which is treated by the method of this invention is of little importance. For ease of operation the pressure on a liquid stream should exceed the vapor pressure of the mixture being purified at the system temperature and the pressure on a vapor stream should not be so high as to cause condensation in the bed. Ethylene oxide purifications may be carried out at almost any pressure. Convenience and cost usually require that pressures of from 5 p.s.i.a. to 200 p.s.i.a. be used and pressures of 20 p.s.i.a. to 80 p.s.i.a. are preferred. The selective adsorption of acetaldehyde will take place over the entire range of pressures usually encountered.

It is intended to embrace within the scope of the invention any adsorbent material having a porosity greater than 5 angstrom units which will effect preferential adsorption of acetaldehyde from a mixture of ethylene oxide and acetaldehyde.

The minimum bed height and bed diameter will be dependent upon the rate of adsorption of acetaldehyde contained in the feed stream and the desired purity of the ethylene oxide product. As the linear velocity of the feed stream through the bed increases, the amount of acetaldehyde adsorbed in the bed is decreased.

Broadly the superficial space velocity of the feed stream through the bed is .01 to 100 feet per second and desirably .01 to 10 feet per second.

In view of the foregoing disclosure, variations and modifications thereof will be apparent to one skilled in the art, and it is intended to include within the invention all such variations and modifications except as do not come within the scope of the appended claims.

What is claimed is:

1. A process for the purification of ethylene oxide containing acetaldehyde, comprising passing the mixture through a bed a molecular sieves having pore diameters of about 5 angstrom units at a superficial space velocity in the range of from about .01 to 100 feet per second, at a temperature of from 0° C. to 100° C., and at a pressure of from 5 p.s.i.a. to 200 p.s.i.a., preferentially adsorbing a substantial fraction of said acetaldehyde therein and recovering ethylene oxide substantially free of acetaldehyde.

2. In a process for the purification of ethylene oxide containing acetaldehyde, comprising oxidizing ethylene to form ethylene oxide, the step of passing said ethylene oxide containing acetaldehyde, said stream being at a temperature of from 0° C. to 100° C., and at a pressure of from 5 p.s.i.a. to 200 p.s.i.a., through a bed of molecular sieves having pore diameters of about 5 angstrom units, adsorbing acetaldehyde therein and recovering ethylene oxide substantially free of acetaldehyde.

3. A process for the purification of ethylene oxide containing acetaldehyde, comprising passing the mixture through a bed of molecular sieves having pore diameters of about 5 angstrom units at a superficial space velocity in the range of from about .01 to 100 feet per second, at a temperature of from 30° C. to 70° C., and at a pressure of from 20 p.s.i.a. to 80 p.s.i.a., preferentially adsorbing a substantial fraction of said acetaldehyde therein and recovering ethylene oxide substantially free of acetaldehyde.

References Cited

UNITED STATES PATENTS

| 2,325,577 | 7/1943 | Balcar | 260—348 |
| 2,818,137 | 12/1957 | Richmond et al. | 55—75 |
| 2,882,243 | 4/1959 | Milton | 55—75 X |
| 2,993,916 | 7/1961 | Normington | 260—348 |

OTHER REFERENCES

Examine These Ways to Use Selective Adsorption. In Petroleum Refiner 36(7) pp. 136–140, July 1957.

REUBEN FRIEDMAN, *Primary Examiner.*

J. ADEE, *Assistant Examiner.*